United States Patent Office

Re. 27,252
Reissued Dec. 21, 1971

27,252

THERMAL METHOD FOR PRODUCING HEAVY OIL

Isadore Sklar and G. W. Walker, Bakersfield, Calif., assignors to Mobil Oil Corporation No Drawing. Original No. 3,379,246, dated Apr. 23, 1968, Ser. No. 663,168, Aug. 24, 1967, which is a continuation of Ser. No. 444,395, Mar. 31, 1965. Application for reissue Mar. 14, 1969, Ser. No. 817,224
Int. Cl. E21b *43/24*
U.S. Cl. 166—251 23 Claims

Matter enclosed in heavy brackets [ ] appears in the original patent but forms no part of this reissue specification; matter printed in italics indicates the additions made by reissue.

ABSTRACT OF THE DISCLOSURE

A method for producing hydrocarbons from a subterranean formation by moving therethrough an in situ combustion front between input and output wells. Formation fluid is displaced toward each output well. When directional movement of the front, which may be monitored, will displace formation fluid beyond the drainage radius of an output well, steam is injected, one or more times, in a quantity into such well to increase the flow of formation fluid from the output well sufficiently to correct directionally the movement of the front for displacing greater amounts of formation fluid into the drainage radius of this output well. Hydrocarbons are recovered from the fluid produced from the output wells.

This application is a continuation of application Ser. No. 444,395, filed Mar. 31, 1965, now abandoned.

This invention relates to the recovery of hydrocarbons from a subterranean formation, and relates more particularly, to the recovery of such materials by the method involving combustion in-place of a portion of the hydrocarbon material in the formation. In one aspect, the invention relates to a method for adjustment in the directional movement of a combustion front in a subterranean formation employed for the recovery of hydrocarbons by the in situ combustion method.

It has been proposed to recover hydrocarbons, in the nature of heavy viscous oils, from a subterranean formation by a method which is commonly known as in situ combustion. In this methed, combustion supporting gas is injected into the formation through an input well with ignition of hydrocarbons within the adjacent formation initiated by suitable means for establishing a combustion front. The formation is usually provided with one or more output wells for the production of formation fluid. The output wells may be spaced about each input well according to regular or irregular criterion depending upon the particular well pattern employed. As the flow of combustion supporting gas to the formation is continued, the combusiton front is moved from the input well toward the output wells. Combustion gases, water, heavy oil distillation and viscosity breaking products of the hydrocarbons are among the fluid which is displaced before the combustion front toward the output wells from which wells this fluid may be produced for recovery of the hydrocarbons. The desired hydrocarbons are recovered from this fluid by suitable means. The combustion front in displacing the mobile hydrocarbons before it in the formation uses as fuel as residual carbonaceous deposit. This carbonaceous deposit is basically the fuel consumed in this method.

For any particular formation and pattern of input and output wells and in consideration of the formation characteristics there will be required in the injected combustion supporting gas a sufficient quantity of oxygen so as to maintain at least a certain minimum rate of combustion front advance to prevent its extinguishment. Additionally, an upper limit in the rate of combustion front advance may exist regardless of the amounts of combustion supporting gas injected which limit resides in the ability of the hydrocarbons displaced before the advancing combustion front to flow through the formation without a liquid block forming which can retard or even extinguish the combustion front. Further, the displaced hydrocarbons may be driven by the front between the output wells outside their drainage radius where it cannot be produced. As is usually true in nature, the possibilities of the formation being uniform, both vertically and horizontally, in its geological characteristics including permeability, porosity, oil saturation, and other reservoir characteristics is small. As a result, the combustion supporting gas injected through the input well moves the combustion front preferentially in certain directions determined by the formation geological characteristics. For example, in heavy oil formations of the type found in California, the production of the heavy oil displaced before an advancing combustion front from the formation into an output well is very limited prior to its being made very mobile by combustion products and temperature increases. Such well because the oil moving by it is so viscous may not be able to produce, even with pumping, more than a fraction of the oil displaced into its drainage radius by the combustion front. Thus, whenever the combustion front moves toward such well, amounts of hydrocarbons displaced before the front in excess of the oil that can be produced from such output well are diverted into regions of the formation beyond its drainage radius. Therefore, this displaced oil is unrecoverable through such well and may for practical purposes be lost. In conjunction with this problem, the formation usually has such geological characteristics that the combustion front by its directional movement displaces oil predominantly in one direction. Under these conditions, the front displaces oil such that it may eventually reside outside of the drainage radius of the output wells in the existing pattern and the areal sweep of the combustion front suffiers correspondingly. Where liquid blocking occurs before the advancing combustion front, the combustion front may be extinguished in these particular areas or diverted along other directions. Thus, in summary, there exists a problem in present in situ combustion methods not only in adjusting the direction of movement of a combustion front between an input well and an output well, and adjusting its rate of movement, but in producing the displaced hydrocarbons from the output wells at suitable rates.

Various methods have been proposed in the past for adjusting the operating conditions of the combustion front for improving the production of output wells and the recovery of heavy oils from subterranean formation. In one method, the amounts of combustion supporting gas introduced into the formation, and the pressures at the input and output wells, are adjusted for maintaining the rate of combustion front advance and a production of oil from the output wells. However, such procedure is usually limited by the injection pressure not exceeding the overburden pressure before fracturing in the input well, especially in shallow formations, and the production pressure in the output well being maintained at about atmospheric pressure. Also, the effects of the magnitudes of these pressure, and their differences, do not influence the rate of combustion front advance the same as the production rates of the displaced oil. These situations also become more difficult to manage where several output wells are in a pattern with each input well. The present invention in carrying out an in situ combustion method employs, in a new and novel manner, an increase in production from the output wells, so arranged, that not only may the direction of a burning front advance be adjusted, but also its rate of advance from an input well toward each output well.

It is therefore an object of the present invention to provide an in situ combustion method for producing hydrocarbons, such as heavy oils, from subterranean formations, which method does not suffer from the prior difficulties residing in the lack of uniform movement of a combustion front advancing toward an output well. Another object is to provide in such method steps for adjusting the operative conditions, particularly the directional movement, of a combustion front. Another object is to provide in such method a procedure for adjusting the rate of advance of a combustion front. Yet another object is to provide a procedure for adjusting the rate of production of output wells in the in situ combustion pattern in a manner that the foregoing objects may be obtained. Another further object is to adjust the production of an output well so as to obtain a suitable production of formation fluids to facilitate the carrying out of an in situ combustion method. Another further object is to provide an in situ combustion method wherein inexpensive fluid injection is employed for adjusting the production of hydrocarbons from an output well and where such production is not only greatly improved as to the maximum rate of flow obtained but also such increased production rates are sustained over a longer period of time than has been heretofore obtained in such formation for a given quantum of injected fluid.

These and further objects will become more apparent when considered in conjunction with the following detailed specification setting forth illustrative embodiments of the present invention and the attached claims.

Summary of the invention

In accordance with this invention, there is provided a method of in situ combustion for recovering hydrocarbons from a subterranean formation employing spaced input and output well means. A combustion front is moved, by passage of a combustion supporting gas, between the well means to provide for the production, from the output well means, of formation fluid which contains hydrocarbons. A quantity of steam is injected into the formation from each of the well means, while temporarily interrupting any production of fluid therefrom. The injected steam introduces a sufficient quantum of heat into the formation about such well means, that upon their being placed [in] *on* production, the rate of fluid production is increased in an amount effecting adjusting in the advance of the combustion front, toward the well means, thereby to displace greater quantities of formation fluid into the drainage radius of the output well means. If desired, the injection of stream into the output well means may be periodically repeated. Also, the advance of the combustion front may be monitored in its movement toward the output well means.

In situ combustion methods for producing hydrocarbons are usually applied to formations which contain a heavy viscous oil. The characteristics of the formation and the oil are such that the production of such oil by primary reservoir forces from an output well means, even by pumping, is rather low. Advantageously, such oils undergo a rather large decrease in viscosity upon being heated to elevated temperatures, thereby becoming sufficiently mobile for ready production. The California oil sands, as for example in the South Belridge Field, are of this nature. For facility in describing this invention, it will be assumed that the in situ combustion method will be carried out in such a formation. For this purpose, input and output well means are provided into the earth for establishing fluid communication between the earth's surface and the subterranean formation. There may be one or more each of input and output well means in a surface pattern, regular or irregular in configuration. Such well means may be provided, completed, and equipped in any suitable manner for carrying out an in situ combustion method and many such arrangements are known.

A combustion supporting gas, by suitable injection apparatus, is passed through the formation from the input well means to the output well means until communication is established therethrough by a continuous gas phase existing between such well means. Combustion supporting gas from any source and with any composition may be employed, which gas is capable of sustaining combustion of the in-place hydrocarbonous materials in the formation. The combustion supporting gas may be air, oxygen, gaseous diluents with oxygen, and mixtures thereof; and if desired, a fluid fuel may be mixed therewith if greater heat production is desired in the resultant combustion front at any particular time. The hydrocarbon materials residing in the formation adjacent the input well means are heated by suitable means to their ignition temperature so that therein results a combustion front. Heating may be obtained by elecertic heaters, pyrotechnical devices, gas burners, all associated with the input well means and other heating means. In some cases, the passage of a combustion supporting gas through the formation will result in sufficient heating by autooxidation to ignite the hydrocarbon materials in the formation. The passing of the combustion supporting gas with heating of the hydrocarbon materials adjacent the input well means may be taken simultaneously, or in any order, as long as there results a combustion front.

The passage of the combustion supporting gas is continued through the formation at a sufficient gas flux to move the combustion front from the input well means toward the output well means. By gas flux, as it is used herein, is meant the volume of the mentioned gas injected per unit time for each square foot of frontal area of the combustion front. This movement of the combustion front will provide for the production from the output well means of formation fluid displaced in the formation before the advancing combustion front. The injection of the combustion supporting gas must be above a certain minimum rate in order to maintain propagation of the combustion front; and the particular maximum amounts injected will reflect upon the area swept by such front and its rate of advance. It is considered that the gas flux of the injected combustion supporting gas is proportional to the rate of burning front advance, all other things being equal. The injection of the combustion supporting gas generally is not attempted at injection pressures in the input well means, to obtain a maximum gas flux, where fracturing of the formation would occur.

Under the foregoing conditions it will be apparent that the combustion front moves toward the output well means from the vicinity of the input well means as long as the injection of the combustion supporting gas continues at a suitable gas flux. It is most desirable for optimum hydrocarbon recovery that the combustion front be continuously propagated in all directions at a uniform rate of advance throughout the pattern between the input and output well means. The rate of combustion front advance may be generally adjusted by varying the gas flux present in the formation at the combustion front. This adjustment becomes more complex whenever a plurality of input well means are in the pattern containing the combustion front. However, in the past, efforts to make adjustment to the directional movement of the combustion front between the input well means and one or more output well means have been considered most difficult by the present applicants. For example, the combustion front travels preferentially and at greater rates of advance along paths of least resistance and these paths may be by directional permeability or by oil saturation and other anisotropical physical conditions in the formation, and for other reasons. When the combustion front tends to travel nonuniformly or along certain preferential directions of movement the areal sweep efficiency within a given in situ combustion pattern is greatly reduced. The combustion front may also move, for one reason or another, in a direction such that the displaced hydrocarbons are moved outside of the drainage radius of the adjacent output well means. The displaced hydrocarbons may be displaced at rates sufficient to cause liquid blocks or in excess of the production rates of the output well means toward which they migrate. Thus, for practical purposes and for various reasons, the displaced hydrocarbons can become unrecoverable. Where at all possible, optimum hydrocarbons recovery occurs when the combustion front moves uniformly and at the greatest rate of advance toward the output well means displacing hydrocarbons at a rate of such a magnitude that the predominant portion of the displaced formation fluid may be produced from such output well means for their recovery.

The position, continuity, and rate of advance of the combustion front during its movement between the input and output well means can be monitored by any suitable means, if desired, for obtaining best results from this invention. A plurality of temperature-monitoring wells provided into the formation at spaced locations within the formation to be subjected to the in situ method may be used for monitoring purposes. Other monitoring methods may be employed, such as measuring gas volumes in the flows from the output wells and determining the gas composition which reflect the directional movement of the combustion front and its rate of advance. Additionally, procedures employing certain practices such as disclosed in the U.S. Patents 2,800,183, 2,843,207, and 3,044,543 may be employed.

In accordance with this invention, the operative conditions, especially the directional movement and the rate of advance of the combustion front can be adjusted by action taken relative only to the output wells, all other things being equal. More particularly, it has been found that by such action the output well means may be made to produce fluid from the formation at an increased rate sufficient to effect adjustment in the operative conditions of the combustion front for overcoming directional movement and related problems previously mentioned. For this action, there is injected into the formation from the output well means, while temporarily suspending production of any formation fluid therefrom, steam until a quantum of heat is introduced into the formation surrounding said output well means. The quantum of heat is sufficient, that upon placing the output well means on production, there is obtained a rate of fluid production increased in an amount which affects adjustment in the operative conditions of the advancing combustion front positioned between the input and output well means. The increased rate of fluid production resides in the temperature imparted to the formation surrounding the output well means effecting a lowering of viscosity in the hydrocarbons and makes their movement easier toward the output well means. At this time no known equation or formula can be stated for determining by calculations the particular quantum of heat introduced by steam injection into the surrounding formation in order to obtain a desired increased rate of fluid production from the output well means. However, there generally will be for any given formation and advancing combustion front a relationship between the quantum of heat introduced and the increase in rate of production of fluids effected from the output well means, all other things being equal. This relationship can be determined experimentally, or by field trials, or by other methods.

Preferably the output well means are injected with steam at some time during the period when combustion supporting gas is passed through the formation from the input well means. Preferably, steam injection is undertaken at a time after the combustion front is established and is moving away from the input well means. However, there does not appear at the present to be any criticality as to the timing of the steam injection occurrence during the combustion supporting gas injection, or the combustion front movement. If desired, where the production rates from the output well means are not adequate by a first steam injection, steam may be reintroduced one or more times to effect adjustment in the rate of producing fluid from such means until desired adjustment to the operating conditions of the combustion front are obtained. Steam for injection purposes may be from any source and may be superheated or wet. Preferably, good results are obtained with an 80 percent quality steam. Any steam of a nature employed for well stimulation purposes, or for steam flooding, can be utilized for practicing this invention.

Although the output well means may be returned immediately to production after steam injection is terminated, it is preferred that it be shut-in for a period of time. The exact interval of time is not critical. However, after steam injection, the output means are usually shut in until substantially all of the injected steam is condensed in the formation adjacently surrounding the output well means. This insures optimum heat utilization and that no live steam will be produced with the formation fluid from such output well means to protect operating personnel from injury by live steam. For this purpose, a rough rule of thumb will be that the shut-in time to obtain a suitable condensation is about one-half the interval taken for injecting the steam.

As an example of the method described, assume a regular geometric pattern of input and output well means where the input well means is located centrally at a uniform spacing from each of the surrounding output well means. One example of such arrangement is the inverted 9-spot pattern. In this pattern, the combustion supporting gas is injected through a centrally disposed input well means and the combustion front is propagated outwardly toward eight output well means which reside one at each corner of an octagon. To secure optimum production of hydrocarbons from the output well means in a pattern the combustion front should be preferably propagated uniformly in all directions from the input well means and at a uniform rate of advance in each such direction so that it reaches all output well means at about the same time. Assume that directional permeability exists along a line which extends midway between a pair of the output well means in such pattern and in one direction from the input well means. Under such conditions, all other things being equal, the combustion front will be preferentially propagated at a given rate of gas flux along such one direction of preferential movement and the hydrocarbons displaced before such advancing front will pass into portions of the formation beyond the drainage radius of the adjacent output well means. Thus, the combustion front is moving at a rate greater in such preferred one direction than along directions toward the output well means. By the procedure of this invention, the output well means each side of a line which is aligned with the greatest directional movement and toward which the directional movement of the approaching combustion front is to be adjusted from its preferential direction receives the injection of steam until a quantum of heat is introduced into the adjacent surrounding formation such that there is obtained a suitable increased fluid production from such means. This increased fluid production results from the reduced viscosity of the hydrocarbons by temperature increases, and for other reasons which will be hereinafter set forth. Preferably, the increase in the rate of fluid production is in an amount effecting adjustment in the directional movement of the combustion front moving from the input well means toward these output well means sufficient to divert the movement of the combustion front, from the previously described preferential direction, into directions more aligned toward these output well means. By this invention, the uniform continuous movement directionally of the combustion front also toward each of the other output well means in the pattern can similarly be obtained. If it is found that additional movement, in the same or other undesired directions, occurs in the combustion front, steam may again be injected into the concerned output well means to correct such directional movement problems. These results foster a greater efficient utilization of the combustion supporting gas with earlier hydrocarbon production and greater total hydrocarbon recovery from the formation.

Besides adjustment to the directional movement of the combustion front according to the described procedure of this invention, the rate of advance of the combustion front may also be altered to obtain front-advancement uniformly, to increase the rate of advance, or both. As previously mentioned, the combustion supporting gas flux is one factor in determining the rate of advance of the combustion front toward each output well means. However, where conditions of liquid blocking occur at some position intervening between such combustion front and the output well means, the rate of advance of the combustion front is restricted or even may be extinguished at such position. Injection steam under the priorly mentioned conditions into the output well means disposed on the opposite side of the region from the input well means where liquid blocking occurs will effect adjustment to the operative conditions therein and help remove this problem. Sufficient steam may of course be injected to dispose completely of the liquid blocking problem. Thus, the directional movement of the combustion front and its rate of advance may be adjusted by employing this invention. If desired, especially where the output well means cannot produce formation fluid at a rate equal to the rate at which formation fluid is displaced into their drainage radii, the output well means may receive sufficient steam to increase suitably their fluid production to also correct for this problem. Thus, the present invention makes the output wells adjustable pressure sinks so as to bring under control movement of the combustion front and formation fluids toward them.

Another unexpected advantage and result is obtained through the injection of steam under the mentioned conditions into the output well means during an in situ combustion method employed for recovery of hydrocarbons from a subterranean formation. It has been found earlier that injecting steam into a production well employed for the primary recovery of heavy viscous oil for an interval of time, and then returning it to production, effects a lowering in oil viscosity to increase temporarily the production rates of viscous oil. The production rates of the heavy oil increase with increasing radius of the heated area of the formation surrounding such well. Usually, the average increase in maximum production rate is only several-fold the rate prior to steam injection in this well although a 10-fold increase has sometimes been obtained. To achieve higher production rate increases involves heating the formation surrounding a production well to an impractical radius. As the formation fluids flow back to the heated area during production, the area shrinks in dimension and produces a decrease in the production rates to near their original values. One means of explaining the results of steam injection increases to production rates is the removal of flow-blocking agents from about a wellbore in the immediate adjacent formation with the introduced heat lessening the viscosity of the heavy oil. When the introduced heat obtained through steam injection is lost from the surrounding formation, any increase in the production rate is principally obtained only by the clearing of the wellbore and immediate adjacent formation. In primary recovery production wells, not associated with a secondary recovery method, the increases in production rate obtained by periodic, or isolated, steam injection are short-lived and undergo a rapid decline to near their original values.

However, in an in situ combustion method, injecting steam into an output well means according to the present invention has provided over a 100-fold increase in maximum production rate of heavy oil and also with a major portion of this increase sustained over an unexpectedly extended period of time. The reason for such vastly improved increases, both in magnitude and duration, in production rate is not known with complete certainty at the present time.

Returning to the description of the present method, after the injection of steam is terminated, fluid is produced from the output well means which have received the steam injection; and hydrocarbons are recovered from such fluid in any suitable manner. Various suitable means may be employed for carrying out this step if desired. As a result of the preceding steps of this invention it will be apparent that all of the stated objects have been satisfied and that the passage of the combustion front from the input well means is facilitated toward the output well means to improve the recovery of hydrocarbons from the formation.

It will be understood that certain features and subcombinations are of utility and may be employed without reference to other features and subcombinations. This is contemplated by and is within the scope of the claims.

As many embodiments as possible may be made of the invention without departing from the scope thereof. It is to be understood that all matter herein set forth is to be interpreted as illustrative and not in a limiting sense.

What is claimed is:

1. A method of in situ combustion for producing hydrocarbons from a subterranean formation having positioned therein spaced input and output well means in fluid communication therewith, the steps comprising:

(a) passing a combustion supporting gas through the formation from the input well means to the output well means until communication is established therethrough with heating of the hydrocarbon materials residing in the formation adjacent said input well means to their ignition temperature whereby a combustion front results therein, (b) continuing the passage of the combustion supporting gas through the formation at a sufficient gas flux to move the combustion front in the formation from the input well means toward the output well means to provide for the production from the output well means of formation fluid displaced before the advancing combustion front, (c) injecting a quantity of steam into the formation from said output well means where the continued directional uncorrected advance of the combustion front would displace formation fluid beyond the drainage radius of said output well means, while injecting steam temporarily suspending production of any formation fluid from said output well means receiving steam, for introducing a sufficient quantum of heat into the formation surrounding said output well means receiving steam injection so that there will be obtained a rate of fluid production upon placing said output well means on production increased in an amount effecting adjustment in the directional movement of the combustion front positioned between said input and output well means to displace greater quantities of formation fluid into the drainage radius of said output well means, and after the injection of steam is terminated, (d) producing formation fluid from said output well means which received the steam injection and recovering hydrocarbons from such fluid whereby the passage of the combustion front from the input well means is facilitated directionally toward said output well means to improve the recovery of hydrocarbons from the formation.

2. A method of in situ combustion for producing hydrocarbons from a subterranean formation having positioned therein spaced input and output well means in fluid communication therewith, the steps comprising:

(a) passing a combustion supporting gas through the formation from the input well means to the output well means until communication is established therethrough with heating of the hydrocarbon materials residing in the formation adjacent said input well means to their ignition temperature whereby a combustion front results therein, (b) continuing the passage of the combustion supporting gas through the formation at a sufficient gas flux to move the combustion front in the formation from the input well means toward the output well means to provide for the production from the output well means of formation fluid displaced before the advancing combustion front, (c) injecting a quantity of steam into the formation from each of said output well means toward which the directional movement of the approaching combustion front is to be adjusted to prevent displacement of formation fluid beyond the drainage radius of said output well means, while injecting steam temporarily suspending production of any formation fluid from said output well means receiving steam, for introducing a sufficient quantum of heat into the formation surrounding each said output well means receiving steam so that there is obtained a rate of fluid production upon placing each said output well means on production increased in an amount effecting adjustment in the directional movement of the combustion front positioned between said input and output well means to displace greater quantities of formation fluid into the drainage radius of said output well means, and after the injection of steam is terminated, (d) producing formation fluid from said output well means which received the steam injection and recovering hydrocarbons from such fluid whereby the passage of the combustion front from the input well means is facilitated directionally toward said output well means to improve the recovery of hydrocarbons from the formation.

3. A method of in situ combustion for producing hydrocarbons from a subterranean formation having positioned therein spaced input and output well means in fluid communication therewith, the steps comprising:

(a) passing a combustion supporting gas through the formation from the input well means to the output well means until communication is established therethrough with heating of the hydrocarbon materials residing in the formation adjacent said input well means to their ignition temperature whereby a combustion front results therein, (b) continuing the passage of the combustion supporting gas through the formation at a sufficient gas flux to move the combustion front in the formation from the input well means toward the output well means to provide for the production from the output well means of formation fluid displaced before the advancing combustion front, (c) injecting a quantity of steam into the formation from each said output well means where the combustion front approaches under directional conditions such that if continued uncorrected, quantities of displaced hydrocarbons will be moved beyond the drainage radius of each such output well means, while injecting steam temporarily suspending production of any formation fluid from said output well means receiving steam, for introducing a sufficient quantum of heat into the formation surrounding such output well means receiving steam so that there is obtained a rate of fluid production upon placing each said output well means on production increased in an amount effecting adjustment in the directional advance of the combustion front sufficient to direct increased quantities of the displaced hydrocarbons into the drainage radius of such output well means, and after the injection of steam is terminated, (d) producing fluid from said output well means which received the steam injection and recovering hydrocarbons from such fluid whereby the passage of the combustion front from the input well means is facilitated toward the output well means to improve the recovery of hydrocarbons from the formation.

4. A method of in situ combustion for producing hydrocarbons from a subterranean formation having positioned therein spaced input and output well means in fluid communication therewith, the steps comprising:

(a) passing a combustion supporting gas through the formation from the input well means to the output well means until communication is established therethrough with heating of the hydrocarbon materials residing in the formation adjacent said input well means to their ignition temperature whereby a combustion front results therein, (b) continuing the passage of the combustion supporting gas through the formation at a sufficient gas flux to move the combustion front from the input well means toward the output well means to provide for the production from the output well means of formation fluid displaced before the advancing combustion front, (c) injecting steam into the formation from said output well means while temporarily suspending production of any formation fluid therefrom sufficient in amount to introduce a quantum of heat into the formation surrounding said output well means adequate to produce a rate of fluid production from such means increased in an amount effecting adjustment in the operative conditions of advancing the combustion front toward said output well means, and after the injection of steam is terminated, (d) producing formation fluid from said output well means which receive the steam injection and recovering hydrocarbons from such fluid whereby the passage of the combustion front from the input well means is facilitated toward the output well means to improve the recovery of hydrocarbons from the formation, and (e) periodically repeating the step (c) with respect to each output well means where an adjustment of the combustion front into a more favorable movement toward said output well means is to be adjusted while said combustion front is advancing thereto-ward.

5. A method of in situ combustion for producing hydrocarbons from a subterranean formation having positioned therein spaced input and output well means in fluid communication therewith, the steps comprising:

(a) passing a combustion supporting gas through the formation from the input well means to the output well means until communication is established therethrough with heating of the hydrocarbon materials residing in the formation adjacent said input well means to their ignition temperature whereby a combustion front results therein, (b) continuing the passage of the combustion supporting gas through the formation at a sufficient gas flux to move the combustion front from the input well means toward the output well means to provide for the production from the output well means of formation fluid displaced before the advancing combustion front, (c) monitoring the advance of said combustion front in its movement toward said output well means, (d) injecting steam into the formation from said output well means while temporarily suspending production of any formation fluid therefrom sufficient in amount to introduce a quantum of heat into the formation surrounding said output well means adequate to produce a rate of fluid production from such means increased in an amount effecting adjustment in the operative conditions of advancing the combustion front toward said output well means, and after the injection of steam is terminated.

(c) producing formation fluid from said output well means which received the steam injection and recovering hydrocarbons from such fluid whereby the passage of the combustion front from the input well means is facilitated toward the output well means to improve the recovery of hydrocarbons from the formation.

6. A method of in situ combustion for producing hydrocarbons from a subterranean formation having positioned therein spaced input and output well means in fluid communication therewith, the steps comprising:

(a) passing a combustion supporting gas through the formation from the input well means to the output well means until communication is established therethrough with heating of the hydrocarbon materials residing in the formation adjacent said input well means to their ignition temperature whereby a combustion front results therein.

(b) continuing the passage of the combustion supporting gas through the formation at a sufficient gas flux to move the combustion front in the formation from the input well means toward the output well means to provide for the production from the output well means of formation fluid displaced before the advancing combustion front, (c) monitoring the advance of said combustion front in its directional movement toward said output well means, (d) injecting into the formation from each of said output well means toward which the directional movement of the approaching combustion front is to be adjusted a quantity of steam while temporarily suspending production of any formation fluid therefrom for introducing a sufficient quantum of heat into the formation surrounding each said output well means so that there is obtained a rate of fluid production upon placing each said output well means on production increased in an amount effecting adjustment in the directional movement of the combustion front positional between said input and output well means, and after the injection of steam is terminated, (e) producing formation fluid from said output well means which received the steam injection and recovering hydrocarbons from such fluid whereby the passage of the combustion front from the input well means is facilitated directionally toward said output well means to improve the recovery of hydrocarbons from the formation.

7. A method of in situ combustion for producing hydrocarbons from a subterranean formation having positioned therein spaced input and output well means in fluid communication therewith, the steps comprising:

(a) passing a combustion supporting gas through the formation from the input well means to the output well means until communication is established therethrough with heating of the hydrocarbon materials residing in the formation adjacent said input well means to their ignition temperature whereby a combustion front results therein, (b) continuing the passage of the combustion supporting gas through the formation at a sufficient gas flux to move the combustion front in the formation from the input well means toward the output well means to provide for the production from the output well means of formation fluid displaced before the advancing combustion front, (c) monitoring the directional movement of the combustion front as it advances toward said output well means, (d) injecting into the formation from each said output well means where the combustion front approaches under directional conditions such that if continued quantities of displaced hydrocarbons will be moved beyond the drainage radius of such output well means a quantity of steam while temporarily suspending production of any formation fluid therefrom for introducing a sufficient quantum of heat into the formation surrounding such output wells so that there is obtained a rate of fluid production upon placing each said output well means on production increased in an amount effecting adjustment in the directional advance of the combustion front sufficient to direct increased quantities of the displaced hydrocarbons into the drainage radius of such output well means, and after the injection of steam is terminated, (e) producing fluid from said output well means which received the steam injection and recovering hydrocarbons from such fluid whereby the passage of the combustion front from the input well means is facilitated directionally toward the output well means to improve the recovery of hydrocarbons from the formation.

8. In a method of in situ combustion for producing hydrocarbons from a subterranean formation having positioned therein spaced input and output well means in fluid communication therewith, and which well means provide for the injection and production of fluid between the earth's surface and said formation, and from which input well means an in situ combustion front is moved toward the output well means for displacing formation fluid containing hydrocarbons toward the output well means, the steps of:

(a) injecting a quantity of steam into the formation from said output well means where the uncorrected directional advance of the combustion front would move undesired quantities of displaced hydrocarbons beyond the drainage radius of such output well means, said steam injection introducing a sufficient quantum of heat into the formation surrounding said output well means receiving steam to obtain a rate of fluid production, upon placing said well means on production, increased in an amount effecting adjustment in the directional movement of the combustion front which approaches the output well means to displace greater quantities of formation fluid into the drainage radius of said output well means, and (b) producing formation fluid from said output well means which received steam injection, and recovering hydrocarbons from such fluid, whereby the passage of the combustion front through the formation is facilitated directionally toward the output well means to improve the recovery of hydrocarbons from the formation.

9. In the recovery of hydrocarbons from a subterranean hydrocarbon-bearing formation penetrated by a plurality of output wells and at least one input well and subjected to an in situ combustion procedure in which carbonaceous materials in said formation are subjected to combustion with a combustion front advanced through said formation toward said output wells by the injection of a combustion-supporting gas through said at least one input well, and with formation fluid containing hydrocarbons being produced from said output wells, the improvement comprising the steps of:

(a) injecting steam into at least one of said output wells toward which the combustion front advance requires directional correction for obtaining a more optimum recovery of hydrocarbons from said formation, said steam being injected in an amount sufficient to heat said formation surrounding said steam receiving output well so that the production thereinto of formation fluid will be increased by the amount which results in producing the required directional correction toward said steam receiving output well in the advance of said combustion front, and (b) producing formation fluid from said at least one of said output wells after receiving steam injection and recovering hydrocarbons from said fluid.

10. In a method of in situ combustion for producing hydrocarbons from a subterranean formation having positioned therein at least one input well and a plurality of output wells, said wells being spaced from each other and in fluid communication with said formation, the steps comprising:

(a) passing a combustion supporting gas through said formation from at least one input well to said output wells with ignition of hydrocarbon material residing in said formation adjacent said input well whereby a combustion front results therein, (b) continuing the passage of said combusion supporting gas through said formation at a sufficient gas flux to move said combustion front from said input well toward said output wells to provide for the production from said output wells of formation fluid displaced before said moving combustion front, (c) injecting into said formation from at least one of said output wells, while temporarily suspending production of any formation fluid therefrom, steam in an amount to introduce a quantum of heat into said formation surrounding said one output well adequate to produce a rate of fluid production therefrom increased in an amount effecting adjustment in the operative conditions of moving said combustion front toward said one output well, (d) terminating injection of said steam into said formation from said one output well, (e) thereafter producing formation fluid from said one output well and recovering hydrocarbons from said fluid, and (f) repeating step (c) at least once, whereby the movement of said combustion front from said input well is facilitated toward said one output well to improve the recovery of said hydrocarbons from said formation.

11. A method of in situ combustion for producing hydrocarbons from a subterranean formation having positioned therein at least one input well and a plurality of output wells, said wells being spaced from each other and in fluid communication with said formation, the steps comprising:

(a) passing a combustion supporting gas through said formation from at least one input well to a plurality of output wells with ignition of hydrocarbon material residing in said formation adjacent said input well whereby a combustion front results therein, (b) continuing the passage of said combustion supporting gas through said formation at a sufficient gas flux to move said combustion front from said input well toward said output wells to provide for the production from said output wells of formation fluid displaced before said moving combustion front, (c) injecting into said formation from at least one of said output wells toward which directional movement of the approaching combustion front is to be adjusted while temporarily suspending production of any formation fluid therefrom steam in an amount to introduce a quantum of heat into said formation surrounding said at least one of said output wells adequate to produce a rate of fluid production therefrom increased in an amount effecting adjustment in the operative conditions of moving said combustion front toward said at least one of said output wells, (d) terminating injection of said steam into said formation from said at least one of said output wells, (e) thereafter resuming production of formation fluid from said at least one of said output wells and recovering hydrocarbons from said fluid, and (f) repeating step (c) at least once from said at least one of said output wells, whereby the movement of said combustion front from said input well is facilitated toward said at least one of said output wells to improve the recovery of said hydrocarbons from said formation.

12. A method of in situ combustion for producing hydrocarbons from a subterranean formulation having positioned therein at least one input well and a plurality of output wells, said wells being spaced from each other and in fluid communication with said formation, the steps comprising:

(a) passing a combustion supporting gas through said formation from an input well to said output wells with ignition of hydrocarbon material residing in said formation adjacent said input well whereby a combustion front results therein, (b) continuing the passage of said combustion supporting gas through said formation at a sufficient gas flux to move said combustion front from said input well toward said output wells to provide for the production from said output wells of formation fluid displaced before said moving combustion front, (c) injecting into said formation from each of said output wells toward which directional movement of the approaching combustion front is to be adjusted while temporarily suspending production of any formation fluid therefrom steam in an amount to introduce a quantum of heat into said formation surrounding each of said output wells adequate to produce a rate of fluid production therefrom increased in an amount effecting adjustment in the operative conditions of moving said combustion front toward each of said output wells, (d) terminating injection of said steam into said formation from each of said output wells, (e) thereafter resuming production of formation fluid from each of said output wells and recovering hydrocarbons from said fluid, and (f) injecting steam into said formation at least one more time from at least one of said output wells from which steam was injected into said formation in step (c) while temporarily suspending production of any formation fluid therefrom in an amount to introduce a quantum of heat into said formation surrounding said at least one of said output wells adequate to produce a rate of fluid production therefrom increased in an amount effecting adjustment in the operative conditions of moving said combustion front toward said at least one of said output wells, whereby the movement of said combustion front from said input well is faciltated toward each of said output wells to improve the recovery of said hydrocarbon from said formation.

13. A method of in situ combustion for producing hydrocarbons from a subterranean formation having positioned therein at least one input well and a plurality of output wells, said wells being spaced from each other and in fluid communication with said formation, the steps comprising:

(a) passing a combustion supporting gas through said formation from an input well to said output wells with ignition of hydrocarbon material residing in said formation adjacent said input well whereby a combustion front results therein, (b) continuing the passage of said combustion supporting gas through said formation at a sufficient gas flux to move said combustion front from said input well toward said output wells to provide for the production from said output wells of formation fluid displaced before said moving combustion front, (c) injecting into said formation from each of said output wells toward which directional movement of the approaching combustion front is to be adjusted while temporarily suspending production of any formation fluid therefrom steam in an amount to introduce a quantum of heat into said formation surrounding each of said output wells adequate to produce a rate of fluid production therefrom increased in an amount effecting adjustment in the operative conditions of moving said combustion front toward each of said output wells, (d) terminating injection of said steam into said formation from each of said output wells, (e) thereafter resuming production of formation fluid from each of said output wells and recovering hydrocarbons from said fluid, and (f) injecting steam into said formation at least one more time from each of said output wells from which steam was injected into said formation in step (c) while temporarily suspending production of any formation fluid therefrom in an amount to introduce a quantum of heat into said formation surrounding each of said output wells adequate to produce a rate of fluid production therefrom increased in an amount effecting adjustment in the operative conditions of moving said combustion front toward said at least one of said output wells, whereby the movement of said combustion front from said input well is facilitated toward each of said output wells to improve the recovery of said hydrocarbons from said formation.

14. In a method of in situ combustion for producing hydrocarbons from a subterranean formation having positioned therein at least one input well and a plurality of output wells, said wells being spaced from each other and in fluid communication with said formation, the steps comprising:

(a) passing a combustion supporting gas through said formation from at least one input well to said output wells with ignition of hydrocarbon material residing in said formation adjacent said input well whereby a combustion front results therein, (b) continuing the passage of said combustion supporting gas through said formation at a sufficient gas flux to move said combustion front from said input well toward said output wells to provide for the production from said output wells of formation fluid displaced before said moving combustion front, (c) monitoring the advance of said combustion front in its movement toward said output wells, (d) injecting into said formation from at least one of said output wells, while temporarily suspending production of any formation fluid therefrom, steam in an amount to introduce a quantum of heat into said formation surrounding said one output well adequate to produce a rate of fluid production therefrom increased in an amount effecting adjustment in the operative conditions of moving said combustion front toward said one output well, (e) terminating injection of said steam into said formation from said one output well, and (f) thereafter producing formation fluid from said one output well and recovering hydrocarbons from said fluid, whereby the movement of said combustion front from said input well is facilitated toward said one output well to improve the recovery of said hydrocarbons from said formation.

15. The method of claim 14 wherein step (d) is repeated at least once.

16. A method of in situ combustion for producing hydrocarbons from a subterranean formation having positioned therein at least one input well and a plurality of output wells, said wells being spaced from each other and in fluid communication with said formation, the steps comprising:

(a) passing a combustion supporting gas through said formation from at least one input well to a plurality of output wells with ignition of hydrocarbon material residing in said formation adjacent said input well whereby a combustion front results therein, (b) continuing the passage of said combustion supporting gas through said formation at a sufficient gas flux to move said combustion front from said input well toward said output wells to provide for the production from said output wells of formation fluid displaced before said moving combustion front, (c) monitoring the advance of said combustion front in its movement toward said output wells, (d) injecting into said formation from each of said output wells toward which directional movement of the approaching combustion front is to be adjusted while temporarily suspending production of any formation fluid therefrom steam in an amount to introduce a quantum of heat into said formation surrounding each of said output wells adequate to produce a rate of fluid production therefrom increased in an amount effecting adjustment in the operative conditions of moving said combustion front toward each of said output wells, (e) terminating injection of said steam into said formation from each of said output wells, and (f) thereafter resuming production of formation fluid from each of said output wells and recovering hydrocarbons from said fluid, whereby the movement of said combustion front from said input well is facilitated toward each of said steam receiving output wells to improve the recoverey of said hydrocarbons from said formation.

17. The method of claim 16 wherein step (d) is repeated at least once at each of said output wells.

*18. In a method for recovering petroleum from an underground reservoir thereof having little or no natural energy and wherein said reservoir is penetrated by an injection well and a producing well, the improvement which comprises*

*establishing a burning zone in said reservoir at the face of said injection well,*

*introducing an oxygen-containing gas into said reservoir via said injection well to move said zone toward said producing well and to generate gaseous production products,*

*injecting steam into said reservoir via said producing well to reduce the viscosity of the petroleum in the vicinity of said producing well,*

*thereafter reducing the pressure on said reservoir by placing said producing well on production while introducing oxygen-containing gas into said reservoir via said injection well to propagate said burning zone toward said producing well and*

*recovering petroleum from the latter.*

*19. The method of claim 18 in which the oxygen-containing gas is injected continuously.*

*20. In a method for recovering petroleum from an underground petroleum reservoir having little or no natural energy and wherein said reservoir is penetrated by a producing well and an injection well into which reservoir an oxygen-containing gas is injected via said injection well to maintain and to move an established burning zone toward said producing well and to generate gaseous combustion products, the improvement which comprises:*

*injecting steam into said reservoir via said producing well to reduce the viscosity of the petroleum in the vicinity of said producing well,*

*thereafter reducing the pressure on said reservoir by placing said producing well on production while continuing the injection of said oxygen-containing gas into said reservoir via said injection well for continual propagation of said burning zone toward said producing well, and*

*recovering petroleum from said producing well.*

*21. In a method of recovering petroleum from an underground petroleum reservoir penetrated by a produc-*

*ing well and an injection well into which reservoir an oxygen-containing gas is injected via said injection well to maintain and to move an established burning zone toward said producing well, the improvement which comprises:*

*injecting steam into said reservoir via said producing well to reduce the viscosity of the petroleum in the vicinity of said producing well,*

*thereafter discontinuing the injection of steam via said producing well and placing said producing well on production while continuing the injection of said oxygen-containing gas into said reservoir via said injection well for continual propagation of said burning zone toward said producing well, and*

*recovering petroleum from said producing well.*

*22. In a method of recovering hydrocarbons from a subterranean hydrocarbon-bearing formation penetrated by a plurality of output wells and at least one input well and subjected to an in situ combustion procedure in which carbonaceous materials in said formation are subjected to combustion with a combustion front advanced through said formation toward said output wells by the injection of a combustion-supporting gas through said at least one input well and with formation fluid containing hydrocarbons being produced from said output wells, the improvement comprising the steps of:*

*(a) injecting steam into a plurality of said output wells toward which the combustion front advances, said steam being injected in an amount sufficient to heat said formation surrounding said steam receiving output well so that the production thereinto of formation fluid will be increased, and*

*(b) producing formation fluid from said at least one of said output wells after receiving steam injection and recovering hydrocarbons from said fluid.*

*23. The method of claim 22 in which said steam is injected first into one of said output wells and then into additional of said output wells.*

References Cited

The following references, cited by the Examiner, are of record in the patented file of this patent or the original patent.

UNITED STATES PATENTS

| | | | |
|---|---|---|---|
| 1,107,416 | 8/1914 | Dunn | 166—276 |
| 2,390,770 | 12/1945 | Barton et al. | 166—251 |
| 2,813,583 | 11/1957 | Marx et al. | 166—271 |
| 2,914,309 | 11/1959 | Salomonsson | 166—256 X |
| 2,952,450 | 9/1960 | Purre | 166—259 X |
| 3,120,264 | 2/1964 | Barron | 166—257 |
| 3,126,961 | 3/1964 | Craig et al. | 166—303 |
| 3,130,781 | 4/1964 | Koch | 166—256 |
| 3,259,186 | 7/1966 | Dietz | 166—263 |
| 3,280,909 | 10/1966 | Closmann et al. | 166—263 |

OTHER REFERENCES

Walter: "Application of Heat for Recovery of Oil: Field Test Results and Possibility of Profitable Operation," Journal of Petroleum Technology, February 1957, pp. 16–22.

STEPHEN J. NOVOSAD, Primary Examiner

U.S. Cl. X.R.

166—261, 263

UNITED STATES PATENT OFFICE

CERTIFICATE OF CORRECTION

Patent No. Re. 27,252 Dated December 21, 1971

Inventor(s) Isadore Sklar and G. W. Walker

It is certified that error appears in the above-identified patent and that said Letters Patent are hereby corrected as shown below:

Column 1, line 58, "combusiton" should read --combustion--;
line 67, "as residual" should read --a residual--.
Column 2, line 43, "suffiers" should read --suffers--.
Column 3, line 52, "adjusting" should read --adjustment--;
line 56, "stream" should read --steam--.
Column 4, line 22, "elecertic" should read --electric--.
Column 7, line 15, "uniformly" should read --uniformity--;
line 23, "Injection" should read --Injecting--.
Column 14, line 8, "formulation" should read --formation--;
line 52, "faciltated" should read --facilitated--.

Signed and sealed this 16th day of May 1972.

(SEAL)
Attest:

EDWARD M.FLETCHER,JR.
Attesting Officer

ROBERT GOTTSCHALK
Commissioner of Patents